Jan. 9, 1968 W. R. GIESKE 3,363,170
PIPE THICKNESS DETECTOR UTILIZING A CORE STRUCTURE
WHICH YIELDS A NARROW SENSING FIELD
Filed Dec. 13, 1965 2 Sheets-Sheet 1

INVENTOR.
WILLIAM R. GIESKE
BY Hazard & Miller
ATTORNEYS

Jan. 9, 1968 W. R. GIESKE 3,363,170
PIPE THICKNESS DETECTOR UTILIZING A CORE STRUCTURE
WHICH YIELDS A NARROW SENSING FIELD
Filed Dec. 13, 1965 2 Sheets-Sheet 2
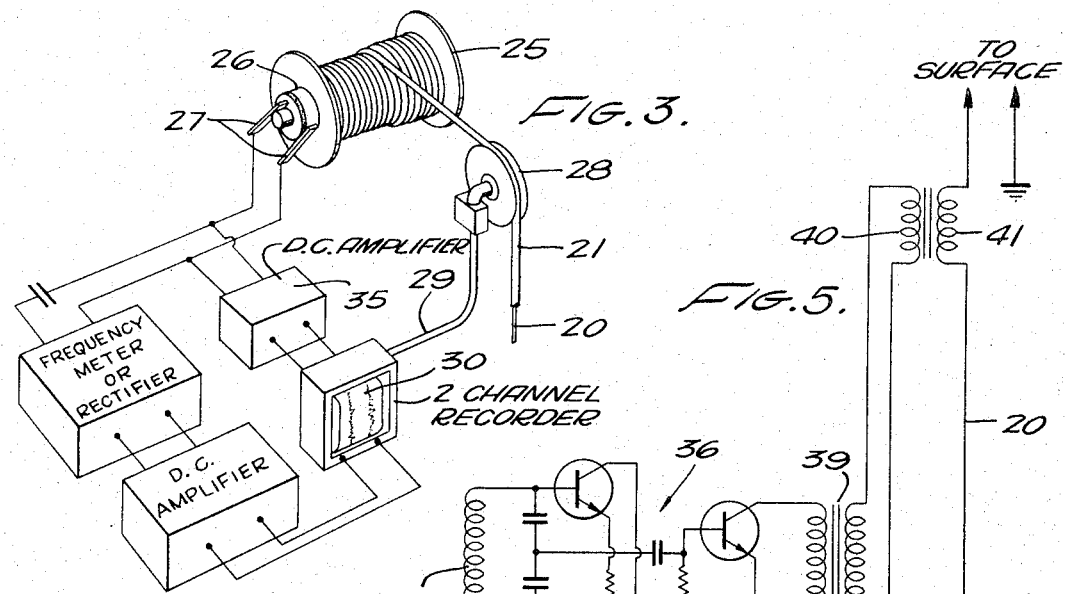
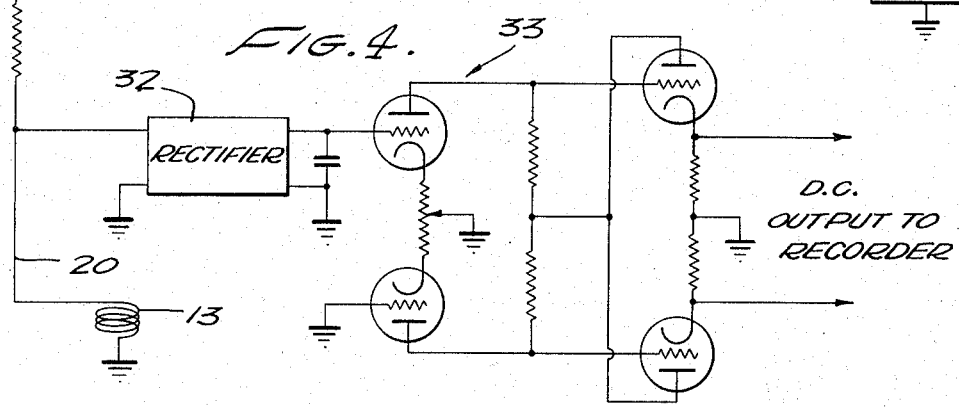
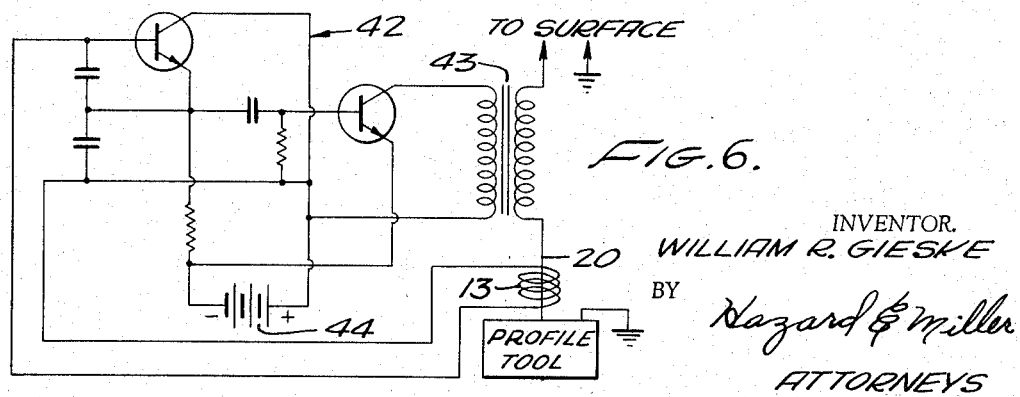
INVENTOR.
WILLIAM R. GIESKE
BY
Hazard & Miller
ATTORNEYS

United States Patent Office 3,363,170
Patented Jan. 9, 1968

3,363,170
PIPE THICKNESS DETECTOR UTILIZING A CORE STRUCTURE WHICH YIELDS A NARROW SENSING FIELD
William R. Gieske, Fullerton, Calif., assignor to The Dia-Log Company, Sante Fe Springs, Calif., a corporation of California
Filed Dec. 13, 1965, Ser. No. 520,817
1 Claim. (Cl. 324—34)

This invention is a continuation in part of my prior application Ser. No. 158,739, filed Dec. 12, 1961, on "Average Calipering Pipes in Wells."

This invention relates to devices for determining the average extent to which the interior of a pipe or tubing has been worn or corroded at a succession of circumferences thereof. The invention has been primarily designed for use in making these determinations on tubings, casing, and similar pipes in wells.

Explanatory of the present invention, tubing calipers have heretofore been developed that are adapted to be lowered into a tubing or casing for the purpose of determining the internal condition thereof. These tubing calipers usually operate on the principle of having a plurality of pivoted fingers or feelers urged to swing outwardly in radial planes into engagement with the interior of the tubing or casing. Such tubing calipers have been lowered into the tubing or casing by means of a conductor line, and as the caliper is moved through the pipe, a finger on swinging outwardly into a depression in the pipe, affects an electrical resistance connected to the conductor of the conductor line and which is measurable at the surface. Such tubing calipers, however, only indicate the maximum distance to which any single finger or feeler has moved outwardly into a depression on the interior of the pipe. If at a given or selected circumference of the pipe there is a single pit or depression into which one of the fingers or feelers has expanded, the magnitude of this pit or depression will be indicated. A pipe having only a single pit or depression at the horizontal circumference is not seriously weakened thereby. On the other hand, if there are a plurality of pits or depressions on the same circumference and of the same depth, these collectively seriously weaken the pipe at this location so that remedial steps should be taken to correct it. The conventional tubing caliper is incapable of indicating whether a single finger or feeler has entered a single pit or depression on the interior of the pipe or whether a plurality of the feelers or fingers have entered a plurality of pits or depressions around the same circumference. Ordinarily, the reading obtainable at the surface is merely an indication of the depth to which a feeler or finger has expanded into the pit or depression of maximum depth and if other feelers or fingers have likewise entered pits or depressions of equal depth or substantially so, this is not indicated. For this reason, tubing calipers of this character are commonly referred to as "profile" calipers in that they merely indicate a profile of the maximum depths of pits or depressions on the interior of the pipe at successive locations along the length of the pipe.

It is of course desirable to not only ascertain the maximum depth of a pit or depression at a succession of circumferences on the interior of the pipe but also to ascertain whether such pit or depression is located on one side of the pipe only, or extends a substantial distance around the circumference. In other words, it is desirable to ascertain not only the maximum depth of the depression but the average of the depression around the entire circumference. Obviously, if there is but a single pit or depression on one side of the pipe only, the pipe is not materially weakened, but if the pit or depression extends around the circumference so that the average depth of the pit or depression is the same around the entire circumference, then the pipe may be severely weakened. The pits or depressions may result from any one of a number of different circumstances such as mechanical wear occasioned by sucker rods, corrosion, or even electrolytic conditions. Regardless of their cause, it is frequently necessary to ascertain not only the maximum depth, but the average depth.

A primary object of the present invention is to provide a method and apparatus for ascertaining the average depth of a pit or depression around a succession of circumferences on the interior of a pipe such as a tubing or casing which can be transmitted and indicated at the surface by the conductor of a single conductor line. Such an indicating means can be used either alone or in conjunction with a profile type tubing caliper and the information obtained thereby can be transmitted to the surface by means of the same conductor that transmits the signal from the "profile" caliper. By thus obtaining not only information as to the maximum depth of a pit or depression at a given circumference but also the average depth at this circumference, the condition of the pipe can be correctly evaluated.

It has been proposed to obtain this information as to the average depth by utilizing a plurality of feelers or fingers and to accumulate readings made by all of these fingers at any selected circumference. The accumulated reading could then be transmitted to the surface. However, as the feelers or fingers must expand on radial planes, it is obvious that as they expand spaces occur between adjacent fingers or feelers. These spaces are not traversed by the feelers or fingers and the readings obtained are therefore at best a mere approximation.

More specifically, an object of the present invention is to provide a method and apparatus that will give an indication that is truely representative of the average depth of a pit or depression around the entire internal circumferences of the pipe. To this end, the present invention contemplates the generation of an electromagnetic flux that extends around the entire interior of the pipe. The field of this continuous or band of flux in one form of the invention includes the thickness of the pipe if the pipe is of a magnetizable material, such as steel. The reactionary effect on the exciting coil is transmitted to the surface and measured, and in one form of the invention it is in effect a measurement of the space or air gap between the core or cores of the exciting coil and the interior of the pipe. If a single pit or depression is located at a selected circumference, this will have only a minor effect in increasing the amount of the air gap. On the other hand, if the pit or depression extends largely around the pipe, this will have a major effect on increasing the total amount of air gap.

In practicing the invention the basic form of electromagnetic coil can be used to caliper pipe in two ways, i.e., to determine metal loss on the inside of the pipe and also on the outside of the pipe. This is accomplished by utilizing high excitation frequency to determine metal loss on the inside of the pipe and a considerably lower frequency to determine metal loss on the outside.

With the foregoing and other objects in view, which will be made manifest in the following detailed description and specifically pointed out in the appended claims, reference is had to the accompanying drawings for an illustrative embodiment of the invention, wherein:

FIG. 3 is a schematic perspective view of apparatus employed at the surface for reading and recording indications made by the sensing apparatus while in the well;

FIG. 4 is a wiring diagram illustrating electrical apparatus that may be employed when the sensing apparatus is used alone, that is, not in conjunction with a profile tubing caliper;

Figures 1, 2:
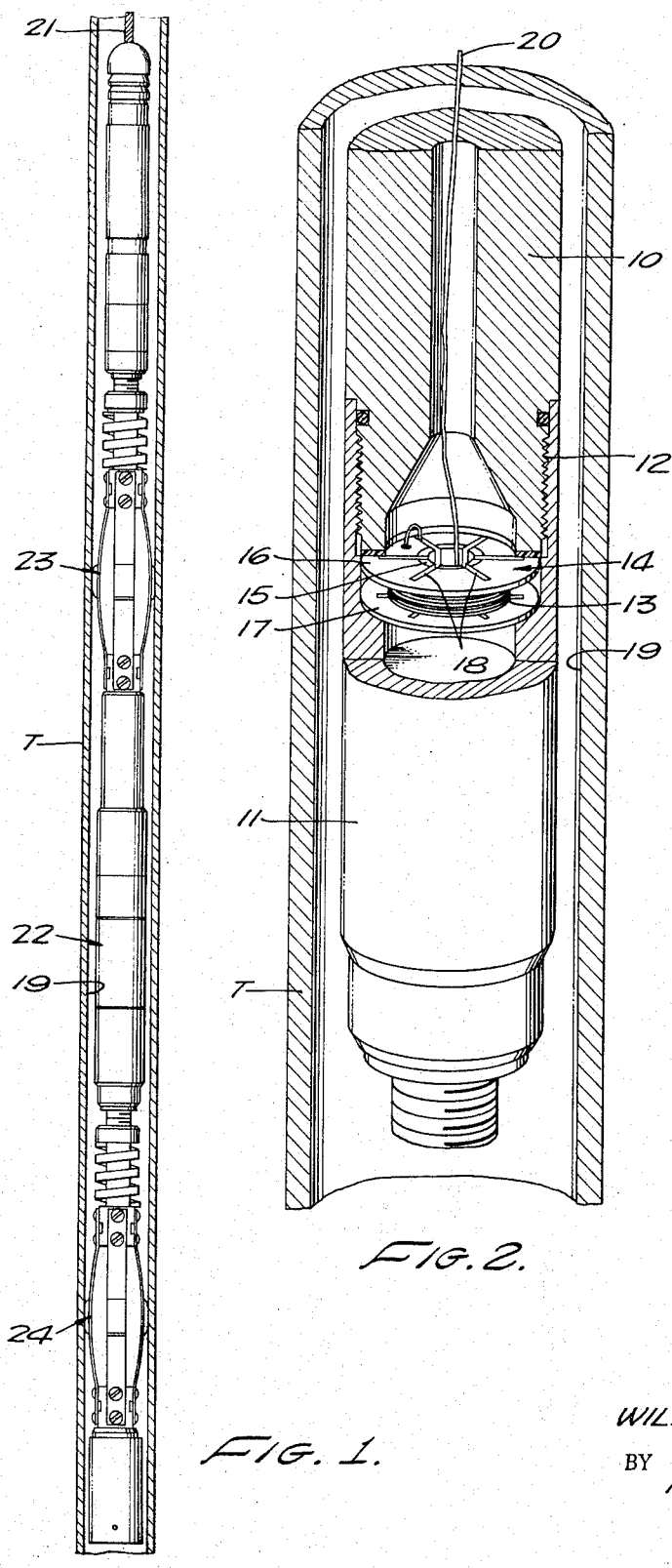
FIG. 1 is a vertical section through a pipe in a well such as a tubing or casing, in which apparatus embodying the present invention is disposed.
FIG. 2 is a partial view in vertical section illustrating details of the apparatus, and particularly the sensing coil of the preferred and simplest form of apparatus.

FIG. 5 is a wiring diagram illustrating electrical apparatus that may be employed when the sensing apparatus embodying the present invention is used in conjunction with a "profile" tubing caliper and the information as to the average pit or depression is transmitted over the same single conductor of the conductor line to the surface which transmits the information that is being simultaneously obtained from the "profile" caliper;

FIG. 6 is another wiring diagram of electrical apparatus that may be employed when the average sensing is being used in conjunction with a "profile" tubing caliper.

Referring to the accompanying drawings wherein similar reference characters designate similar parts throughout, T indicates a tubing casing or other pipe in a well, the internal condition of which it is desired to investigate. As above explained, this tubing may have on its interior either no pits or depressions whatsoever, a single pit or depression on one side of the interior of the tubing only which will not materially weaken the tubing, or it may have a single pit or depression, or a plurality of pits or depressions extending around the interior of the tubing on the same circumference which would materially weaken the tubing.

The sensing apparatus illustrated in FIG. 2 is the simplest and therefore the preferred apparatus for determining the average depth of pits or depressions around the interior of the tubing T at a selected horizontal circumference. It consists of a housing preferably formed of two parts, 10 and 11, threadedly connected together as at 12. These parts are formed of stainless steel, bronze, or other non-magnetic and non-magnetizable material. Within this housing there is positioned a single coil 13 the axis of which is arranged centrally of and coaxial with the vertical housing. This coil is wound on a soft iron or magnetizable core 14 having a central hub portion 15 and upper and lower flanges 16 and 17. Preferably, the core 15 and the flanges 16 and 17 are radially slotted as indicated at 18 for the purpose of reducing eddy currents in the core. The provision of the slots 18 is of importance because any considerable amounts of eddy currents will effect the readings and render the tests less accurate and informative. The slots reduce the eddy currents to a point where reasonably reliable readings can be secured. The flanges have their peripheries preferably continuous as illustrated and positioned outwardly as far as is reasonably feasible in the structure of the housing so as to be as close to the inner surface 19 of the tubing as is reasonably possible.

One side of the coil is electrically grounded to the housing and the other side may be connected to the conductor 20 of a single conductor line 21 by which the housing is lowered into and withdrawn from the tubing. As illustrated in FIG. 1, the housing generally indicated at 22 is preferably located between upper and lower sets 23 and 24 of belly or centering springs which engage the interior of the tubing and serve to hold the housing and the coil 13 centrally of the tubing. These centering springs, however, permit the entire assembly to be raised or lowered in the tubing by the conductor line 21 at will.

The conductor line is adapted to be wound up on or unwound from a spool or reel 25 located at the surface, see FIG. 3. The strands of the cable are grounded and the internal single conductor is electrically connected from an alternating current source to a conductor ring 26 so that brushes 27 will electrically connect the coil 13 to pieces of apparatus illustrated in FIG. 3, subsequently to be described. The conductor cable 21 preferably passes over a drive pulley 28 which drives a flexible cable 29 that advances the paper tape 30 of a recorder proportionately to the distance in the tubing that is traversed by the coil 13.

When the coil 13 is energized by an alternating electric current an alternating electromagnetic flux is developed in its core. This flux passes through the walls of the housing 22 and through the space between the exterior of the housing and the interior surface 19 of the tubing T. As the flanges 16 and 17 of the core are peripherally continuous, this flux is in the nature of a continuous band of flux surrounding the coil and extending continously around an internal circumference of the tubing. While some flux will penetrate the metal of the tubing T, the desired reading in effect is an indication of the space between the edges of the core, flanges 16 and 17, and the surface 19. This space may be likened to an air gap in an electromagnetic circuit that includes the coil 13, its core, and the metal of the tubing T as an armature.

To be most effective to measure this "air gap" the coil should be designed to be resonant as possible with relation to the frequency employed and other surrounding factors including the capacitance of the single conductor line 21. To avoid undue penetration of the tubing T, I find that typical values that are highly suitable in the usual situation are to use approximately 400 turns of #30 wire in the coil 13 and to apply a voltage of from 10 to 20 volts. The frequency employed is preferably in the neighborhood of 300 cycles per second, but this may vary from 200 cycles per second to 400. If lower frequencies are employed in testing the internal pipe surface an undue and undesirable penetration of the metal of the tubing T is apt to occur because of variations in the molecular structure of the pipe and erroneous readings will result, and if higher frequencies are employed distortion of readings becomes more pronounced.

In determining metal loss on the outside of the pipe a much lower frequency is employed which will penetrate the metal of the tubing and give a reading indicating any substantial outer surface metal losses. An ideal frequency for use in calipering the outside of the pipe is 50 cycles per second, but this frequency can be varied within a reasonable range and still produce satisfactory results.

The drawing is not to scale but is merely illustrative and does not attempt to present the coil structure in any specific proportions, although it does illustrate that the vertical height of the coil core is considerably less than the common diameters of the core flanges 16 and 17. Actually, a relationship between the three basic dimensions of the core and its flanges and the wire windings has been determined to produce a unit of maximum sensitivity.

Given the flange dimensions D, the diameter $d$ of the hub 15 on which the wire is wound is half of D. Thus $$d = \frac{D}{2}$$

The vertical height H of the coil 13 between the core flanges 16 and 17 is in a range of ⅕ to ⅙ of the flange diameter D. Thus, $$H = \frac{D}{5} \text{ to } \frac{D}{6}$$

For example, a preferred coil core to caliper 2⅜" O.D.—1.995" I.D. pipe would have the following dimensions:

$$D = 1.500'', \ d = .750'', \ H = .250''$$

A preferred coil to caliper 2⅞" O.D.—2.441" I.D. pipe would have the following dimensions:

$$D = 2.000'', \ d = 1.000'', \ H = .375''$$

A preferred coil to caliper 7" O.D. pipe with varying wall thicknesses to ½" would have the following dimensions:

$$D = 5.375'', \ d = 2.687'', \ H = 1''$$

It should be understood that reasonable variations can be made in the above ratios although they are given as being preferred.

If the tool is to be used alone, that is without being in conjunction with a "profile" caliper, electrical apparatus as illustrated in FIG. 4 may be employed. Therein, a source of low voltage alternating current indicated at 31 in FIG. 5 may be located at the surface, one side of which is connected to ground or to the sheath of the conductor line 21. The other side is connected through the coil 13 which, in turn, is grounded. Brush 27 that is electrically connected to the conductor 20 of the conductor line is, in turn, connected to a D.C. rectifier 32, one side of which is grounded, and the output of this rectifier is connected through a conventional direct current amplifier 33, the amplifier output from which is connected to the recorder which it actuates and causes a record to be drawn on the tape 30 as the tool is drawn upwardly through the tubing. The alternating current supplied to the conductor line 21 by the source 31 causes the coil to generate the alternating magnetic flux. A uniform "air gap" between the edges of the flanges 16 and 17 and the surface 19 on the interior of the tubing where there are no pits or depressions results in a constant inductance in the coil 13. After this alternating current is rectified to direct current to produce a changing amplitude direct current, it is recorded on the tape 30. If there is but a small pit or depression on the interior of the tubing opposite the coil 13 this will have only a minor effect on the change in the inductance of the coil. On the other hand, if the pit or depression is substantial or extends more or less around the tubing about the coil 13, this has the effect of increasing the average thickness of the "air gap." The inductance of coil 13 is consequently changed materially and this material change is recorded on the tape 30 for the depth at which the coil may be located.

If the average sensor represented by the coil 13 and its core are to be used in conjunction with a "profile" tubing caliper the electrical apparatus employed is preferably of the type as illustrated in FIG. 5, wherein the coil 13 has the conductor 20 of the conductor line extending down through it and electrically connected to the "profile" caliper having expansible fingers. The expansion of the fingers into a pit or depression on the interior of the tubing affects a variable resistance controlling direct current that is applied to the conductor 20 at the surface. Variations in this resistance are also recorded on the tape 30 after they have passed through a DC amplifier 35.

In the form of construction shown in FIG. 5, an oscillator indicated at 36 powered by a small battery 37 is included in the housing 22. This oscillator is shown as having a fixed inductance or coil 38 and delivers alternating current powered by the battery 37 at a fixed frequency. This is coupled to the circuit of the coil 13 by a coupling transformer 39 to apply the alternating frequency to the coil. Under these circumstances, one side of the coil 13 is not grounded but is included in the electric circuit containing the primary 40 of a coupling transformer, the secondary 41 of which is electrically connected to the conductor 20 of the conductor line. With the coil 38 fixed the output from the oscillator can be regarded as being of constant frequency energizing the coil 13. The reactionary effect on the inductance of the sensing coil 13 by change in the air gap is transmitted and applied to the conductor 20 through the coupling transformer although this conductor may be conducting direct current from the "profile" caliper. The changes in the inductance of the sensing coil 13 occasioned by the changes in the air gap are descernible after having been rectified and amplified by the rectifier 32 and the amplifier 33.

In FIG. 6 there is disclosed an alternative arrangement when the sensing coil 13 is used in conjunction with a "profile" caliper. In this form of construction the conductor 20 of the conductor line extends downwardly through the sensing coil 13 to the "profile" caliper. The ends of the sensing coil are connected to the oscillator, generally indicated at 42, in lieu of the fixed coil 38. The output of the oscillator is electrically connected through a coupling transformer 43 to the conductor 20 of the conductor line.

With this arrangement, changes in the inductance of the sensing coil 13 occasioned by changes in the air gap between the edges of the flanges 16 and 17 and the interior 19 of the tubing affect or modify the frequency and the amplitude of the oscillator circuit powdered by the battery 44. It will be understood that in this form of construction the oscillator and its battery are located in the housing 22 closely adjacent the sensing coil. In this form of construction the rectifier 32 at the surface may be replaced by a frequency meter which measures changes in the frequency of the oscillator circuit occasioned by changes in the inductance of the sensing coil 13 due to changes in the air gap occasioned by the presence or absence of pits or depressions on the interior of the tubing. The output of the frequency meter is connected to the DC amplifier as before and after being amplified, it is conducted to the recorder where it is recorded on the tape 30. Changes in amplitude of the oscillator circuit 42 can be measured by using the rectifier 32 in lieu of the frequency meter and amplifying its output on the way to the recorder.

It will be observed that when the sensing coil 13 is used alone that the source of alternating current 31 may be located on the surface and conducted to the sensing coil by the conductor 20 of the conductor line. However, when the sensing coil is used in conjunction with a "profile" caliper that the source of alternating current must be separately applied to the sensing coil and to this end the oscillator and its battery are included in the housing 22 and the reactionary effect on the sensing coil occasioned by changes in the air gap are impressed on the conductor 20 and transmitted thereby to the surface along with direct current signals transmitted from the "profile" caliper.

The particular construction of the "profile" caliper may vary considerably and is immaterial insofar as the present invention is concerned. The "profile" caliper disclosed in United States patent application Ser. No. 765,097, filed Oct. 3, 1958, jointly by Theodore L. Berry and myself is suitable.

In all of the above-described constructions it will be appreciated that an electromagnetic field is created in the pipe or tubing extending entirely around a circumference thereof and in such a manner that variations in the tubing wall create a reactionary effect which can be transmitting to the surface on the single conductor of a single conductor line even though the single conductor of the conductor line is also transmitting signals from a "profile" tubing caliper. A more accurate indication of the average wall thickness of the tubing is obtainable than where a plurality of radially expandable fingers or feelers which mechanically touch the tubing wall are employed. As the frequency employed is one which is designed to penetrate the metal of the tubing to a minimum extent, changes in the permeability or molecular construction of the tubing metal have a minimum effect.

The constructions herein disclosed have been primarily designed to indicate wear or corrosion on the interior of a pipe or tubing. In the case of tubing the exterior of the tubing is usually not subject to any great amount of wear or corrosion and is assumed to have retained its external diameter even after long periods of use. Increases in the internal diameter of the tubing occasioned by wear or corrosion are primarily measured and by computation the degree of change from the initial internal diameter can be ascertained.

There may be instances, however, particularly in the case of casing where it is desired to ascertain as close as possible the actual wall thickness, that is, the thickness of metal between the worn or corroded interior of the casing and the worn or corroded exterior of the casing. The forms of construction herein disclosed can be used for the latter purpose by using low frequencies which involve greater flux penetration of the metal wall. These low frequencies have a greater wave length than the higher frequencies mentioned above and therefore penetrate the metal, and if there is a metal loss on the exterior of the pipe, the variation in thickness of the wall of the pipe will produce a variation in flux density which can be read as an indication of such exterior wall deterioration.

It will of course be understood that various changes can be made in the details of construction without departing from the spirit and scope of the invention as defined in the appended claim.

I claim:

1. A device for use with an exploratory well string for investigating the condition of pipe in a well including a supporting conductor line adapted to be connected to signal interpreting means at the surface and adapted to be lower into and withdrawn from the pipe, wherein the improvement comprises: an elongated housing adapted to be connected to and supported by said conductor in said well string and formed of a non-magnetizable material, a magnetizable core supported in the housing coaxially therewith, said core having spaced upper and lower thin plate-like end flanges in planes normal to the longitudinal axis of the housing and having a plurality of radial slots terminating short of the peripheries of the flanges, the peripheries of said flanges being disposed closely adjacent to the exterior of the housing, a coil wound on the core between said flanges and electrically connected to said conductor, the diameter of the core being half the diameters of the flanges, and the axial distance from the upper extent of the upper core flange and the lower extent of the lower core flange being no greater than $1/5$ to $1/6$ the diameter of the flanges, whereby the magnetic field created by the coil and the core and its flanges is considerably less axially than radially and variations in pipe wall thickness are sharply and precisely determinable.

References Cited

UNITED STATES PATENTS

| | | | |
|---|---|---|---|
| 2,104,646 | 1/1938 | Greenslade | 324—34.11 |
| 2,432,982 | 12/1947 | Braddon et al. | 336—83 |
| 2,470,828 | 5/1949 | Millington et al. | 324—34 |
| 2,622,126 | 12/1952 | Bender et al. | 324—37 |
| 2,744,233 | 5/1956 | Paivinen | 324—40 |
| 2,949,591 | 8/1960 | Craige | 336—178 |
| 2,992,390 | 7/1961 | De Witte | 324—34.11 |
| 3,088,068 | 4/1963 | Hall et al. | 324—34.11 |
| 3,159,784 | 12/1964 | Haslett et al. | 324—40 |

OTHER REFERENCES

McMaster, R.: Nondestructive Testing Handbook, 1963 (copyright 1959), The Ronald Press; pp. 37.8–37.10, 37.23–37.27, 38.19–38.23.

RUDOLPH V. ROLINEC, *Primary Examiner.*

WALTER L. CARLSON, *Examiner.*

R. J. CORCORAN, *Assistant Examiner.*